United States Patent
Yang et al.

(10) Patent No.: US 11,656,943 B2
(45) Date of Patent: May 23, 2023

(54) METHOD AND APPARATUS FOR PREDICTING HARD DISK FAULT OCCURRENCE TIME, AND STORAGE MEDIUM

(71) Applicant: ZTE Corporation, Shenzhen (CN)

(72) Inventors: Hongzhang Yang, Shenzhen (CN); Yaofeng Tu, Shenzhen (CN); Yahui Yang, Shenzhen (CN); Zhongliang Li, Shenzhen (CN); Bin Guo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 220 days.

(21) Appl. No.: 17/600,551

(22) PCT Filed: Nov. 28, 2019

(86) PCT No.: PCT/CN2019/121647
§ 371 (c)(1),
(2) Date: Sep. 30, 2021

(87) PCT Pub. No.: WO2020/114313
PCT Pub. Date: Jun. 11, 2020

(65) Prior Publication Data
US 2022/0206898 A1 Jun. 30, 2022

(30) Foreign Application Priority Data
Dec. 5, 2018 (CN) .......................... 201811484874.3

(51) Int. Cl.
*G06F 11/00* (2006.01)
*G06F 11/10* (2006.01)
(Continued)

(52) U.S. Cl.
CPC ........ *G06F 11/1092* (2013.01); *G06F 11/076* (2013.01); *G06F 11/0772* (2013.01);
(Continued)

(58) Field of Classification Search
CPC .... G06F 30/27; G06F 11/008; G06F 11/3447; G06F 11/3409; G06F 11/3034; G06F 11/3452; G06F 11/3457
See application file for complete search history.

(56) References Cited

U.S. PATENT DOCUMENTS 10,191,668 B1 * 1/2019 Traylor ................. G06F 3/0689
10,216,558 B1 * 2/2019 Gaber ................. G06F 11/0727
(Continued)

FOREIGN PATENT DOCUMENTS

| CN | 104503874 A | 4/2015 |
|---|---|---|
| CN | 107025153 A | 8/2017 |

(Continued)

OTHER PUBLICATIONS

European Patent Office. Extended European Search Report for EP Application No. 19892295.7, dated Dec. 16, 2021, pp. 1-7.
(Continued)

*Primary Examiner* — Charles Ehne
(74) *Attorney, Agent, or Firm* — Vivacqua Crane, PLLC

(57) ABSTRACT

Disclosed are method and apparatus for predicting hard disk fault occurrence time of hard disk failure, and storage medium. The method includes steps of: screening a hard disk on the verge of failure from a plurality of hard disks according to state data acquired of hard disks; calculating variation quantity and discrete quantity of each piece of the state data of the hard disk on the verge of failure acquired over a first preset period of time, to obtain a first predicted data set; and inputting the first predicted data set into a first training model to obtain probability of occurrence of failure
(Continued)

for the hard disk on the verge of failure over a future second preset period of time.

15 Claims, 4 Drawing Sheets

(51) Int. Cl.
    *G06F 11/07*     (2006.01)
    *G06F 11/30*     (2006.01)
    *G06F 11/34*     (2006.01)
    *G06F 18/214*     (2023.01)

(52) U.S. Cl.
    CPC ...... *G06F 11/3034* (2013.01); *G06F 11/3055* (2013.01); *G06F 11/3452* (2013.01); *G06F 11/3466* (2013.01); *G06F 18/214* (2023.01)

(56) References Cited

U.S. PATENT DOCUMENTS

| | | | |
|---|---|---|---|
| 10,896,080 B2* | 1/2021 | Wu | G06F 11/0727 |
| 2016/0232450 A1 | 8/2016 | Chen et al. | |
| 2019/0205193 A1* | 7/2019 | Wu | G06N 20/10 |

FOREIGN PATENT DOCUMENTS

| | | |
|---|---|---|
| CN | 108073486 A | 5/2018 |
| CN | 108446734 A | 8/2018 |
| CN | 108647136 A | 10/2018 |
| CN | 109491850 A | 3/2019 |
| CN | 109828869 A | 5/2019 |
| EP | 3306475 A2 | 4/2018 |

OTHER PUBLICATIONS

The State Intellectual Property Office of People's Republic of China. First Search Reoort for CN Application No. 201811484874.3 and English translation, dated Jan. 15, 2020, pp. 1-4.

The State Intellectual Property Office of People's Republic of China. First Office Action for CN Application No. 201811484874.3 and English translation, dated Feb. 3, 2020, pp. 1-15.

The State Intellectual Property Office of People's Republic of China. Second Office Action for CN Application No. 201811484874.3 and English translation, dated Aug. 21, 2020, pp. 1-18.

Ganguly, et al. "A Practical Approach to Hard Disk Failure Prediction in Cloud Platforms," 2016 IEEE Second International Conference on Big Data Computing Service and Applications, pp. 105-116.

Shen, et al. "Random-forest-based failure prediction for hard disk drives," International Journal of Distributed Sensor Networks, vol. 14, Issue 11, 2018, pp. 1-15.

International Search Authority, International Search Report and Written Opinion for PCT Application No. PCT/CN2019/121647 and English translation, dated Mar. 6, 2020, pp. 1-15.

\* cited by examiner

METHOD AND APPARATUS FOR PREDICTING HARD DISK FAULT OCCURRENCE TIME, AND STORAGE MEDIUM

CROSS REFERENCE TO RELATED APPLICATIONS

This application is a national stage filing under 35 U.S.C. § 371 of international application number PCT/CN2019/121647, filed Nov. 28, 2019, which claims priority to Chinese patent application No. 201811484874.3, filed Dec. 5, 2018. The contents of these applications are incorporated herein by reference in their entirety.

TECHNICAL FIELD

The present disclosure relates to the technical field of computers, and in particular to a method and apparatus for predicting occurrence time of hard disk failure and a non-transitory computer readable storage medium.

BACKGROUND

According to statistics at home and abroad, hard disks are a main source of failure in data centers currently. A related report shows that, in a data center with 4000 nodes, a hard disk failure occurs every 6 hours on average. The frequent occurrence of hard disk failures will inevitably lead to serious consequences such as service interruption and data loss. If the occurrence of hard disk failures can be predicted in advance, a great facilitation will be brought to the operation of the data center. At present, the hard disk failure prediction technologies in existing art blindly pursue the improvement in detection rate, which leads to a high false detection rate, so many healthy hard disks will be mistakenly determined as failed hard disks. In addition, the existing hard disk failure prediction technologies can only predict whether a failure occurs in the hard disk, but cannot predict the possible occurrence time of the failure, and thus there may be a long time between the predicted failure and the actual failure (one or two weeks to one or two months), resulting in the waste of the lift cycle of the hard disks and ineffective guidance to the disk replacement. Moreover, the prediction of hard disk failures is limited by various reasons such as a large amount of data to be processed and the limited processing capacity of the processor, therefore a relatively long processing time is needed to obtain the result of prediction (minutes to hours), resulting in a low prediction efficiency of hard disk failures.

SUMMARY

The present disclosure provides a method and an apparatus for predicting occurrence time of hard disk failure and a storage medium, to solve the problem that the occurrence time of hard disk failure cannot be predicted in the existing art.

According to a first aspect of the present disclosure, a method for predicting the occurrence time of a hard disk failure is provided, and may include steps of: screening a hard disk on the verge of failure from a plurality of hard disks according to state data acquired of hard disks; calculating variation quantity and discrete quantity of each piece of the state data of the hard disk on the verge of failure acquired over a first preset period of time, to obtain a first predicted data set; and inputting the first predicted data set into a first training model to obtain probability of occurrence of failure for the hard disk on the verge of failure over a future second preset period of time, where the first training model is trained by a first artificial intelligence algorithm based on a first training data set including positive sample data and negative sample data, where the positive sample data includes variation quantities and discrete quantities corresponding to failed hard disks, and the negative sample data includes variation quantities and discrete quantities corresponding to non-failed hard disks.

According to a second aspect of the present disclosure, an apparatus for predicting occurrence time of hard disk failure is provided, and may include: a screening module, configured to screen a hard disk on the verge of failure from a plurality of hard disks according to acquired state data of the hard disks; a calculation module, configured to calculate variation quantity and discrete quantity of each piece of the state data of the hard disk on the verge of failure acquired over a first preset period of time, to obtain a first predicted data set; and an input module, configured to input the first predicted data set into a first training model to obtain probability of occurrence of failure for the hard disk over a future second preset period of time, where the first training model is trained by a first artificial intelligence algorithm based on a first training data set including positive sample data and negative sample data, where the positive sample data includes variation quantities and discrete quantities corresponding to failed hard disks, and the negative sample data includes variation quantities and discrete quantities corresponding to non-failed hard disks.

According to a third aspect of the present disclosure, an apparatus for predicting occurrence time of hard disk failure may include: a processor; and a memory, configured to store instructions executable by the processor; the instructions, when executed by the processor, cause the processor to execute steps of: screening a hard disk on the verge of failure from a plurality of hard disks according to state data of acquired of the hard disks; calculating variation quantity and discrete quantity of each piece of the state data of the hard disk on the verge of failure acquired over a first preset period of time to obtain a first predicted data set; and inputting the first predicted data set into a first training model to obtain probability of occurrence of failure for the hard disk over a future second preset period of time, where the first training model is trained by a first artificial intelligence algorithm based on a first training data set including positive sample data and negative sample data, where the positive sample data includes variation quantities and discrete quantities corresponding to failed hard disks, and the negative sample data includes variation quantities and discrete quantities corresponding to non-failed hard disks.

According to a fourth aspect of the present disclosure, a non-transitory computer-readable storage medium is provided. The non-transitory computer-readable storage medium stories instructions which, when executed by a processor, cause the processor to execute the method according to the first aspect of the present disclosure.

DETAILED DESCRIPTION

The technical schemes of the embodiments of the present disclosure will be described in detail with reference to the accompanying drawings. It will be apparent that the described embodiments are only a part, not all, of the embodiments of the present disclosure. Based on the embodiments of the present disclosure, all other embodiments obtained by those of ordinary skill in the art without creative effort shall fall within the scope of the present disclosure.

Figure 1:
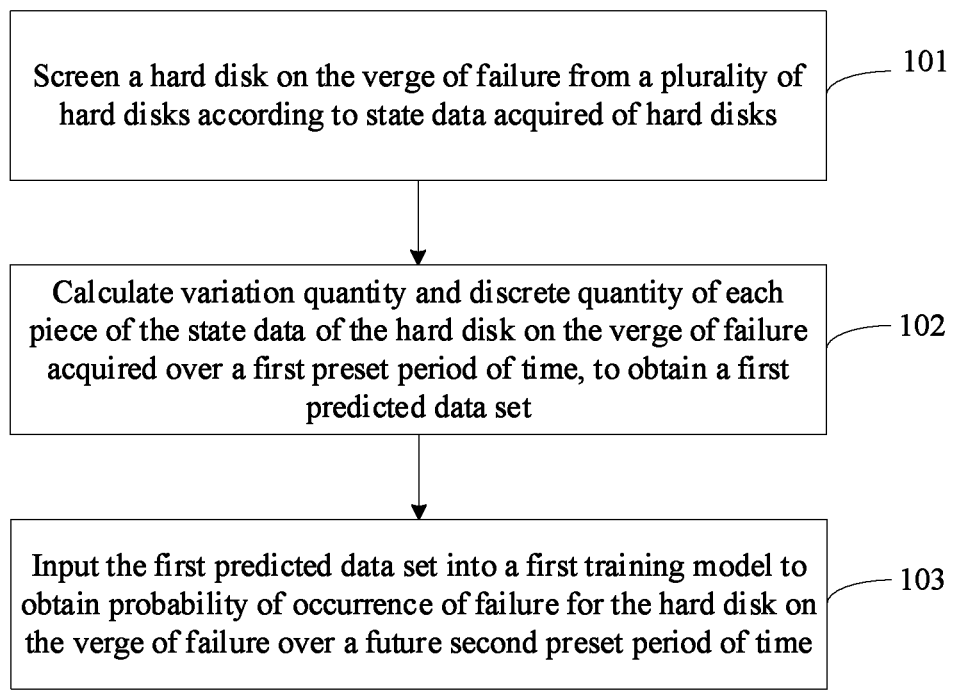
FIG. 1 is a flowchart of a method for predicting occurrence time of hard disk failure according to an embodiment of the present disclosure.

FIG. 1 is a flowchart of a method for predicting occurrence time of hard disk failure according to an embodiment. As shown in FIG. 1, the method includes steps S101 to S103.

At S101, one or more hard disks that are on the verge of failure are screened from a plurality of hard disks according to state data acquired of the plurality of hard disks.

In an exemplary implementation scenario for the method for predicting occurrence time of hard disk failure of the present disclosure, the method can be applied into failure prediction for a large number of hard disks in a data center. The hard disks may be, for example, the hard disks with a SATA (Serial Advanced Technology Attachment) interface. In the step S101, the state data of all the hard disks in the data center may be acquired at a fixed time interval N, where the value of N may be, for example, 3 hours. A tool for acquiring the state data of the hard disks may be one of an open source toolkit matronhoods and an instruction iostat. The state data of the hard disks acquired over a continuous period of time M may be used as an original data set, where the value of M is, for example, 60 days. If it is assumed that there are g hard disks in the data center, there are g*M/N pieces of sample data (also referred to as samples hereinafter) in the original data set. In the method for predicting occurrence time of hard disk failure of the present disclosure, the operation of acquiring the state data of the hard disks may be performed continuously to provide the latest samples.

For example, it is assumed that there are 20000 hard disks in the data center, and it is determined according to the state data of the 20000 hard disks acquired over a certain period of time that 20 hard disks are on the verge of failure, i.e., the 20 hard disks which are on the verge of failure are screened from the total of 20000 hard disks, and the prediction of failure time can be performed on the 20 hard disks only. That is, after the step S101 is performed, the subsequent steps S102 and S103 can be performed on the hard disks on the verge of failure which are screened in the step S101 only. Thus, the number of hard disks for which the prediction of failure time is performed is decreased, the amount of data to be processed is reduced, and the efficiency of the failure time prediction of hard disks is significantly improved.

In an embodiment, the state data of the hard disks may include SMART (Self-Monitoring Analysis and Reporting Technology) information of the hard disks and/or input/output (I/O) information of the hard disks. The SMART information includes at least one of reallocated sector count, reported uncorrectable errors, hardware ECC (error correcting code) recovered, raw read error rate, seek error rate, and high fly write. The I/O information includes at least the number of written bulks (blk_written). For example, the SMART information of hard disks may include at least NORMAL values of the following three items: #5 (Reallocated Sector Count), #187 (Reported Uncorrectable Errors) and #195 (Hardware ECC Recovered). For another example, the SMART information of hard disks may include NORMAL values of the following six items: #1 (Raw Read Error Rate), #5 (Reallocated Sector Count), #7 (Seek Error Rate), #187 (Reported Uncorrectable Errors), #189 (High Fly Write) and #195 (Hardware ECC Recovered). By adding one item in the I/O information, there may be 7 items in the state data of hard disks.

At S102, variation quantity and discrete quantity of each piece of the state data of the hard disks on the verge of failure acquired over a first preset period of time are calculated to obtain a first predicted data set.

The first preset period of time is, for example, 7 days. In the step S102, for example, the state data of the hard disks in the data center acquired in the last 7 days only may be interested.

The first predicted data set may include a plurality of kinds of state data of the hard disks, for example, 7 kinds of state data corresponding to the above 7 items, and each kind of the state data includes a plurality of pieces of data acquired at different times within the first preset period of time. The first predicted data set also may include only one kind of state data of the hard disks., in this case, in the step S102, the variation quantity and the discrete quantity of each piece of data of this kind of state data of the hard disks on the verge of failure acquired within the first preset period of time can be directly calculated.

The discrete quantity can reflect the difference between one piece of the state data and the overall mean of the state data of the hard disks. The discrete quantity may be a variance or a standard deviation. The variation quantity can reflect the change degree of one piece of state data of hard disks over the first preset period of time.

At S103, the first predicted data set is input into a first training model to obtain probability of occurrence of failure for each of the hard disk over a future second preset period of time. The first training model is trained by a first artificial intelligence algorithm based on a first training data set. The first training data set includes positive sample data and negative sample data. The variation quantity and discrete quantity corresponding to failed hard disks are positive sample data, and the variation quantity and discrete quantity corresponding to non-failed hard disks are negative sample data.

The first preset period of time may be greater than or equal to the second preset period of time.

The state data of the hard disks within a period of time before the hard disk are failed may be determined as data corresponding to the failed hard disks; the state data of the hard disks beyond the period of time before the hard disks are failed may be determined as data corresponding to non-failed hard disks, or may be directly deleted; and, the state data of the hard disks that are not failed is determined as data corresponding to non-failed hard disks.

The first artificial intelligence algorithm may include one of a logistic regression algorithm, an artificial neural network algorithm and a random forest algorithm. For example, the first training data set may be trained by the logistic regression algorithm to obtain the first training model.

In the method for predicting occurrence time of hard disk failure provided in the embodiments of the present disclosure, by calculating the variation quantity and discrete quantity of each piece of state data on the basis of the state data of hard disks on the verge of failure acquired over a first preset period of time to obtain a first predicted data set, and by then inputting the first predicted data set into a first training module, the probability of occurrence of failure for each of the hard disk within a future second preset period of time can be calculated, so that the purpose of predicting the occurrence time of failure for a hard disk is achieved.

In an embodiment, when there are one or more hard disks on the verge of failure, the executions of the steps S102 and S103 will be triggered, and it is assumed that the number of the hard disks on the verge of failure is h, and Samples of the h hard disks in the last 7 days (an example of the first preset period of time) are merged to obtain h samples, and each of the h samples has 7 items. The variance (an example of the discrete quantity) and variation quantity of each item of the samples of hard disks in the last 7 days are calculated, such that each of the samples has 14 items. The variances and variation quantities calculated are used as the first predicted data set. The variances and variation quantities corresponding to the h samples are inputted into the first training model obtained by pre-training one by one, so that the probabilities of occurrence of failure for the hard disks in the future 7 days can be obtained one by one.

The process of predicting the failure time of h hard disks on the verge of failure one by one may include the following steps.

For the first hard disk on the verge of failure, the variance and the variation quantity corresponding to this hard disk are inputted into the first training model to obtain the probability p_1 of occurrence of failure for this hard disk in the future 7 days.

. . . (by that analogy, it will not be repeated here)

For the $h^{th}$ hard disk on the verge of failure, the variance and the variation quantity corresponding to this hard disk are inputted into the first training model to obtain the probability p_h of occurrence of failure for this hard disk in the future 7 days.

On the basis of the probabilities of occurrence of failure for the hard disks in the future 7 days obtained in the above process, if the obtained probability of occurrence of failure for one of the hard disks in the future 7 days is greater than a first threshold, the one of the hard disks is considered as being failed within 7 days. The first threshold may have a value ranging from 50% to 90%, for example, 80%. Once the hard disk is considered as being failed in 7 days, the hard disk may be added into a disk replacement alarm list. Operation and maintenance personnel can perform disk replacement according to the disk replacement alarm list. Disk replacements can be performed one by one. For example, the hard disks can be replaced in an order from highest to lowest failure probabilities. During the disk replacements, all data in the hard disks considered as being failed within 7 days may be copied to newly added hard disks, to remain the number of system hard disks unchanged.

In an embodiment, the variation quantity may be calculated by one of equations of $\Delta = \sum_{n=1}^{k} |a_n - a_{n+1}|$, $\Delta = \sum_{n=1}^{k} |a_n - a_{n+2}|$, $\Delta = \sum_{n=1}^{k} |a_n - a_{n+1}|$ and $\Delta = \sum_{n=1}^{k} |a_n - a_{k+n}|$, where $\Delta$ is the variation quantity, $a_n$ is the $n^{th}$ piece of the state data acquired over the first period of time, and k is the total number of the piece of the state data acquired over the first period of time.

Figure 2:
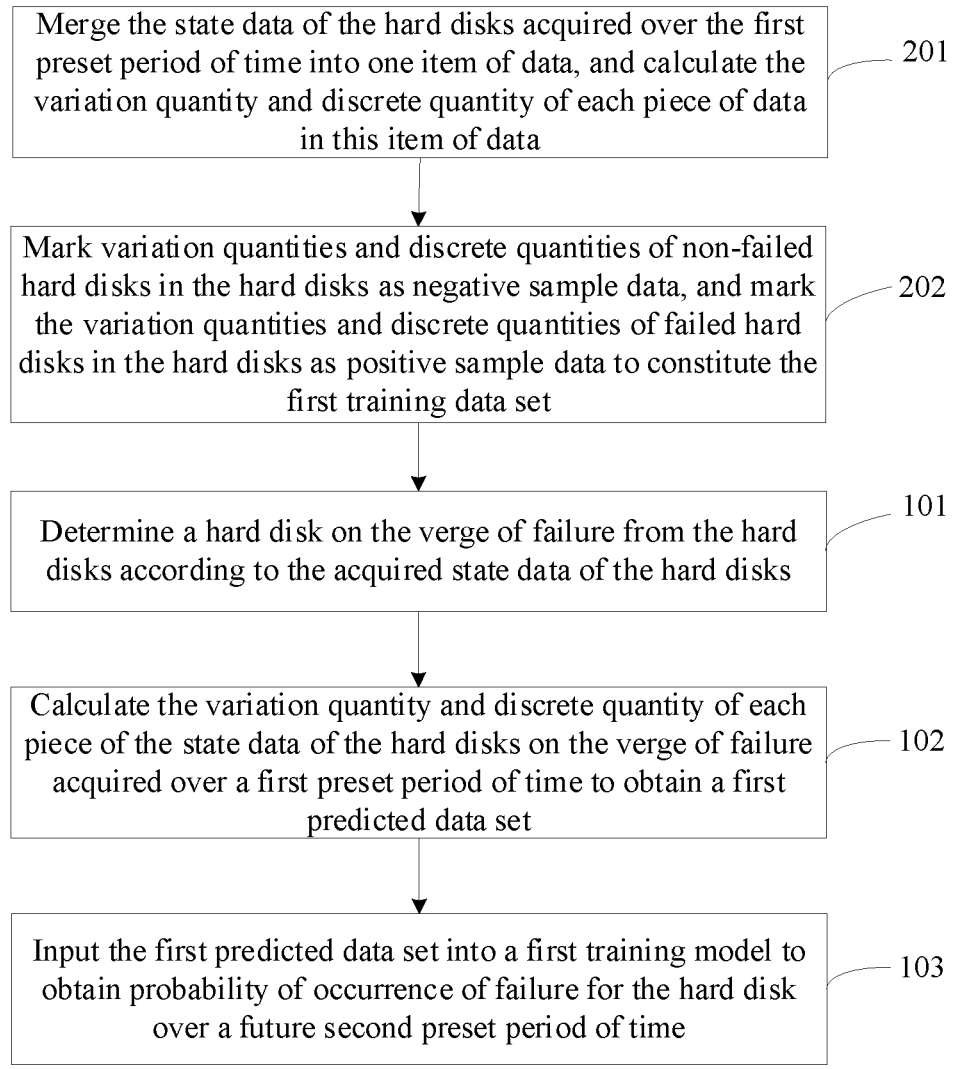
FIG. 2 is a flowchart of a method for predicting occurrence time of hard disk failure according to an embodiment of the present disclosure.

Since a hard disk is gradually degraded during use, if only the state data of the hard disk per se acquired at a time is used as a sample to predict a failure for the hard disk, factors causing gradual degradation of the hard disk during use will be ignored. Therefore, in the method provided in the embodiments of the present disclosure, the prediction of the time of occurrence of failure for a hard disk is performed on the basis of a plurality of samples acquired over a period of time (i.e., the first preset period of time). During the gradual degradation of a hard disk, for example, for the hard disk #187, it is found that it oscillates violently, so all samples of the hard disk #187 within the latest period of time (e.g., last 14 days, as an example of the first preset period of time) can be extracted and merged into one sample. The change degree (including the variation quantity and the discrete quantity) of data in this sample is determined, and the probability of occurrence of failure for this hard disk within a future period of time (e.g., in future 5 days, as an example of the second preset period of time) is predicted on the basis of the change degree. The method for predicting the occurrence time of hard disk failure on the basis of samples acquired over a period of time will be described below with reference to FIG. 2. FIG. 2 is a flowchart of the method for predicting occurrence time of hard disk failure according to an embodiment. As shown in FIG. 2, based on the method shown in FIG. 1, the method may further include steps S201 and S202 as flowing.

At S201, before the first predicted data set is inputted into the first training model, the state data of the hard disks over the first preset period of time is merged into one item of data, and the discrete quantity and variation quantity of each piece of data in this item of data are calculated. The item of data may include data acquired at different times over the first preset period of time.

In the case of acquiring a plurality of kinds of state data of the hard disks at each time, in the step 201, the state data of the same kind of the hard disks acquired over the first preset period of time may be combined into one item of state data.

At S202, the variation quantities and discrete quantities of the non-failed hard disks in the hard disks are marked as negative sample data and the variation quantities and discrete quantities of the failed hard disks in the hard disks are marked as positive sample data, to constitute the first training data set.

The steps S201 and S202 may be performed before or after the steps S101 and S102. FIG. 2 merely shows an embodiment where the step S201 is performed before the step S101.

After the first training data set is obtained, the data set can be trained by the first artificial intelligence algorithm to obtain the first training model.

In an embodiment, the step of screening, one or more hard disks that are on the verge of failure from a plurality of hard disks according to the acquired state data of the plurality of hard disks, may include: inputting the acquired state data (also referred to as a second test data set hereinafter) of the hard disks into a second training model to obtain classification results corresponding to the state data. The classification results have classes of ON THE VERGE OF FAILURE and HEALTH. The second training model is trained by a second artificial intelligence algorithm based on a second training data set including positive sample data and negative sample data, where the negative sample data includes state data corresponding to non-failed hard disks, and the positive sample data includes state data corresponding to failed hard disks. The step further includes: determining one or more hard disks with a proportion of the classification results of the class of ON THE VERGE OF FAILURE in the total classification results obtained exceeding a second threshold as the hard disks that are on the verge of failure. The second threshold may be, for example, 80%.

The process of screening the hard disks that are on the verge of failure from the plurality of hard disks will be described below by way of an example. In an embodiment, a plurality of samples generated by each of the g hard disks in 3 days may be used as the second predicted data set. A small number of samples may cause difficulty in effectively reflecting the deterioration state of the hard disk, on the contrary, a large number of samples may increase data throughput. Advisably, 20 to 40 samples are appropriate, for example, 24 samples are selected.

All the g hard disks are predicted one by one:
{For the first hard disk, the samples are predicted one by one:
{The first sample is inputted into the second training model to obtain a classification result.
The second sample is inputted into the second training model to obtain a classification result.
. . . (by that analogy, it will not be repeated here)
The $24^{th}$ sample is inputted into the second training model to obtain a classification result.
On the basis of the above 24 classification results, if this hard disk has more than t classification results categorized as ON THE VERGE OF FAILURE, a prediction result is obtained that this hard disk is on the verge of failure. The value range of t may be [12, 22]. The value of t may be, for example, 18. If this hard disk has no more than t classification results categorized as ON THE VERGE OF FAILURE, this hard disk is determined as a healthy hard disk.

}
{For the second hard disk, samples are predicted one by one.
...... (by that analogy, it will not be repeated here)
{For the $g^{th}$ hard disk, samples are predicted one by one.
}

In this embodiment, by determining the hard disks on the verge of failure by polling, the hard disks on the verge of failure can be screened from the hard disks in the data center.

The hard disks determined as being on the verge of failure in this process are added to a list of hard disks on the verge of failure. Thus, the hard disks that are about to fail are successfully predicted.

The second artificial intelligence algorithm used for training the second training data set may be, for example, one of a support vector machine algorithm, a Bayesian algorithm and a gradient boosting machine algorithm.

In an embodiment, the step of obtaining the second training data set may include: acquiring the state data of the hard disks over a first preset period to obtain an original data set, where, the first preset period may be, for example, 3 hours; marking the state data in the original data set, where the state data of hard disks over a third preset period of time before failure are marked as positive sample date, the state data beyond the third preset period of time before failure are marked as negative sample data or the state data beyond the third preset period of time before failure are deleted, and the state data of hard disks that are not failed are marked as negative sample data to constitute the second training data set. For example, all the samples in the original data set are marked, where the samples of a healthy hard disk are marked as negative samples; the samples of a failed disk within K time before failure are marked as positive samples; and, the samples of a failed hard disk beyond K time before failure are marked as negative samples or discarded. For example, the value of K is 7 days. Finally, the second training data set is constituted.

In an embodiment, the process of obtaining the first training data set may include: shrinking the original data set, i.e., only the samples of hard disks in last 7 days are reserved. The samples of the hard disks in 7 days are merged to constitute g samples, respectively. Each of the samples has 7 kinds of state data. The discrete quantity and the variation quantity of each piece of the state data of each kind are calculated. Finally, the discrete quantities and variation quantities of the healthy hard disks are marked as negative samples, and the discrete quantities and variation quantities of the failed hard disks are marked as positive samples, to constitute the second training data set. In an embodiment, the method for predicting occurrence time of hard disk failure provided by the present disclosure may further include: updating data to be updated in the original data set with the newly acquired state data of the hard disks, where the data to be updated is the state data in the original data set acquired over the earliest third preset period of time. For example, the state data in the original data set acquired over the earliest second preset period is periodically replaced at the interval of the second preset period with the state data acquired over the latest second preset period, where, the second preset period is, for example, 7 days. Therefore, in the embodiment, the state data in the original data set acquired in the earliest 7 days can be replaced with the state data acquired in the last 7 days for updating the original data set.

The method for predicting occurrence time of hard disk failure provided in the embodiments of the present disclosure will be described below by way of an example. In this example, there are 4800 hard disks in the data center. The SMART information and IO information of the 4800 hard disks are acquired every 3 hours. Each time of the data acquisition on each of the hard disks generates 1 sample. At the end of the $60^{th}$ day, a total of 2304000 samples are generated as the original data set. It is assumed that there are a total of 70 failed disks during the data acquisition.

2270400 samples of 4730 healthy hard disks are marked as negative samples, 3920 samples of 70 failed hard disks acquired in 7 days before the 70 hard disk are failed are marked as positive samples, and the remaining samples are discarded, to constitute a second training data set. The second training data set is trained by a support vector machine algorithm to obtain a second training model.

24 samples of each of the hard disks acquired over last 3 days are inputted into the second training model one by one, such that 24 classification results are obtained for each of the hard disks. If one of the hard disks has more than 18 classification results of ON THE VERGE OF FAILURE, the one of the hard disks is determined as being on the verge of failure, and the one of the hard disks is added to the list of hard disks on the verge of failure, it is assumed that there is a total of 23 hard disks in the list.

The samples of 4800 hard disks in the last 7 days are merged, and the variance and the variation quantity of each of the items of each of the samples in the 7 days are calculated. There are 4800 samples in total, and 14 items contained in each of the samples. The state data of the 4730 healthy hard disks are marked as negative samples and the state data of the 70 failed hard disks are marked as positive samples to constitute a first training data set. The first training data set is trained by a logistic regression algorithm to obtain a first training model.

The samples of the 23 hard disks in the list of hard disks on the verge of failure in the last 7 days are merged, and the variance and variation quantity of each of the items in the 7 days are calculated to generate 23 samples. The 23 samples are inputted into the first training model one by one to obtain the probability of occurrence of failure for each of the hard disks in future 7 days. If the probability for one of the hard disks is greater than 80%, the one of the hard disks is added to a disk replacement alarm list. It is assumed that there are 4 hard disks in total in the disk replacement alarm list. Then, the operation and maintenance personnel can replace the 4 hard disks. The state data of each of the hard disks acquired in the last 7 days is added to the original data set to replace the state data in the original data set detected in the earliest 7 days.

Figure 3:
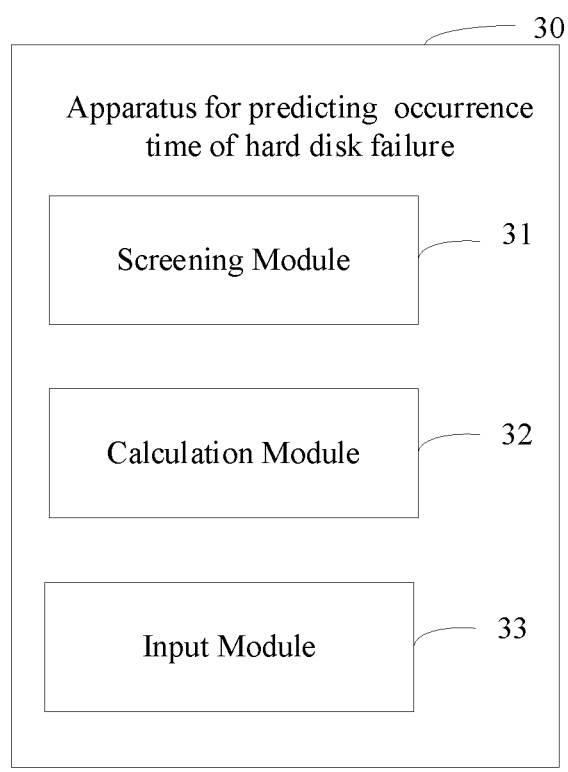
FIG. 3 is a flowchart of a method for predicting occurrence time of hard disk failure according to an embodiment of the present disclosure.

FIG. 3 is a flowchart of an apparatus for predicting occurrence time of hard disk failure according to an embodiment of the present disclosure. As shown in FIG. 3, the apparatus includes the following modules:

a screening module 31, configured to screen one or more hard disks that are on the verge of failure from a plurality of hard disks, according to acquired state data of the plurality of hard disks;

a calculation module 32, configured to calculate variation quantity and discrete quantity of each piece of the state data of the hard disks that are on the verge of failure acquired over a first preset period of time to obtain a first predicted data set; and an input module 33, configured to input the first predicted data set into a first training model to obtain probability of occurrence of failure for each of the hard disks within a future second preset period of time, where the first training model is trained by a first artificial intelligence algorithm based on a first training data set including positive sample data and negative sample data, the positive sample data includes the variation quantities and discrete quantities corresponding to one or more failed hard disks, and the negative sample data includes the variation quantities and discrete quantities corresponding to one or more non-failed hard disks.

In an embodiment, the screening module may include an input unit configured to input the acquired state data of the hard disks into a second training model to obtain classification results corresponding to the state data. The classification results are categorized into ON THE VERGE OF FAILURE and HEALTH, the second training model is trained by a second artificial intelligence algorithm based on a second training data set including positive sample data and negative sample data. The negative sample data includes the state data corresponding to non-failed hard disks in the hard disks, and the positive sample data includes the state data corresponding to failed hard disks. The screening module may further include a determination unit configured to determine hard disks with a proportion of the classification results of ON THE VERGE OF FAILURE in the total classification results obtained exceeding a second threshold as hard disks that are on the verge of failure.

Figure 4:
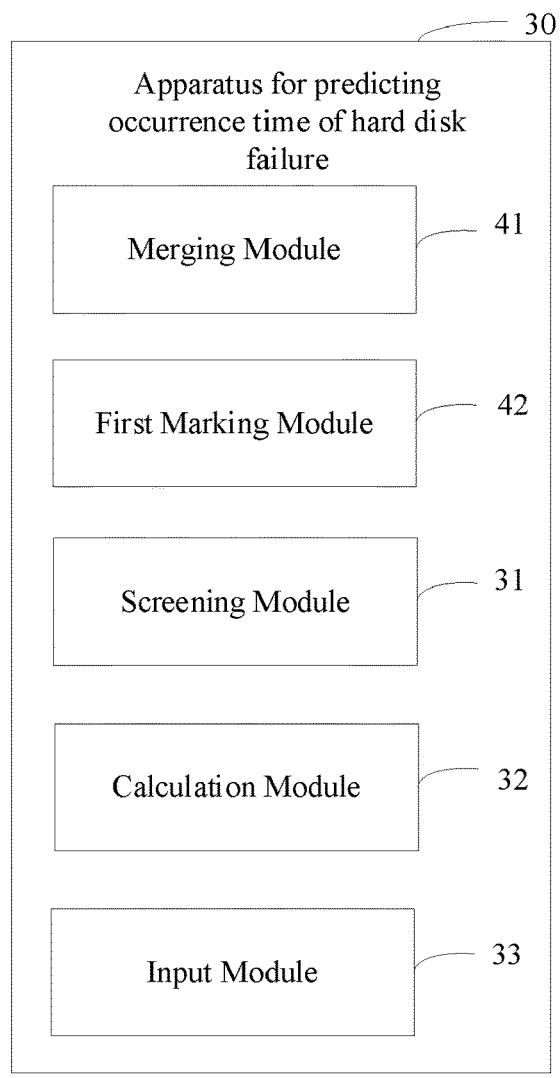
FIG. 4 is a block diagram of an apparatus for predicting occurrence time of hard disk failure according to an embodiment of the present disclosure.

FIG. 4 is a block diagram of an apparatus for predicting occurrence time of hard disk failure according to an embodiment of the present disclosure. As shown in FIG. 4, based on the apparatus shown in FIG. 3, the apparatus may further include a merging module 41 configured to: before the first predicted data set is inputted into the first training model, merge the state data of the hard disks acquired over the first preset period of time into one item of data, and calculate the variation quantity and discrete quantity of each piece of data in this item of data. The apparatus may further include a first marking module 42 configured to mark the variation quantities and discrete quantities of non-failed hard disks in the hard disks as negative sample data and mark the variation quantities and discrete quantities of failed hard disks in the hard disks as positive sample data to obtain the first training data set.

In an embodiment, the state data may include: SMART information and/or I/O information of the hard disks.

In an implementation, the SMART information may include at least one of reallocated sector count, reported uncorrectable errors, hardware ECC recovered, raw read error rate, seek error rate, and high fly write; and, the I/O information includes at least the number of written bulks (blk_written).

In an embodiment, the apparatus may further include an update module configured to update the data to be updated in the original data set with the newly acquired state data of the hard disks, the data to be updated may be the state data in the original data set acquired in the earliest third preset period of time.

In an embodiment, the variation quantity is calculated by one of the equations of: $\Delta=\Sigma_{n=1}^{k}|a_n-a_{n+1}|$, $\Delta=\Sigma_{n=1}^{k}|a_n-a_{n+2}|$, $\Delta=\Sigma_{n=1}^{k}|a_n-a_{n+1}|$ and $\Delta=\Sigma_{n=1}^{k}|a_n-a_{k-n}|$, where $\Delta$ is the variation quantity, $a_n$ is the $n^{th}$ piece of state data acquired over the first period of time, and k is the total number of pieces of the state data acquired over the first period of time.

Figure 5:
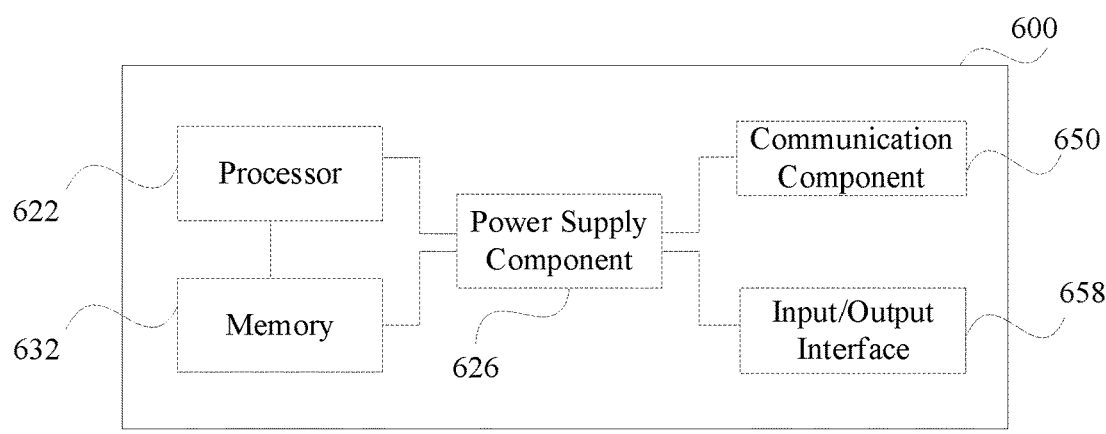
FIG. 5 is a block diagram of an apparatus for predicting occurrence time of hard disk failure according to an embodiment of the present disclosure.

FIG. 5 is a block diagram of an apparatus 600 for predicting occurrence time of hard disk failure according to an embodiment. For example, the apparatus 600 may be provided as a server. With reference to FIG. 5, the apparatus 600 includes a processor 622 (there may be more than one processor) and a memory 632 configured to store computer programs executable by the processor 622. The computer programs stored in the memory 632 may include one or more modules each corresponding to a set of instructions. In addition, the processor 622 may be configured to execute the computer programs so as to execute the method for predicting occurrence time of hard disk failure.

In addition, the apparatus 600 may further include a power supply component 626 and a communication component 650. The power supply component 626 may be configured to perform power supply management for the apparatus 600. The communication component 650 may be configured to realize communication (e.g., wired or wireless communication) with the apparatus 600. In addition, the apparatus 600 may further include an input/output (I/O) interface 658. An operating system stored in the memory 632, for example, Windows Server™, Mac OS X™, Unix™, Linux™ or the like may operate on the apparatus 600.

In another embodiment, a non-temporary computer-readable storage medium storing program instructions, for example, the memory 632 storing the program instructions, is further provided. The program instructions may be executed by the processor 622 of the apparatus 600 to perform the method for predicting occurrence time of hard disk failure.

The present invention has the following beneficial effects: in the method for predicting occurrence time of hard disk failure provided in the embodiments of the present disclosure, by calculating the variation quantity and discrete quantity of each piece of state data on the basis of the state data of the hard disks on the verge of failure acquired over a first preset period of time, the first predicted data set is obtained, and the first predicted data set is then inputted into the first training module to calculate the probability of occurrence of failure for each of the hard disks over a future second preset period of time, such that the purpose of predicting the occurrence time of hard disk failure is achieved.

Although the embodiments of the present disclosure have been disclosed for illustrative purposes, it will be appreciated by those having ordinary skills in the art that various modifications, additions, and substitutions are also possible, and therefore, the scope of the present disclosure should not be limited to the embodiments described above.

The invention claimed is:

1. A method for predicting occurrence time of hard disk failure, comprising steps of:
screening a hard disk on the verge of failure from a plurality of hard disks according to state data acquired of the plurality of hard disks;
calculating variation quantity and discrete quantity of each piece of the state data of the hard disk on the verge of failure acquired over a first preset period of time, to obtain a first predicted data set; and
inputting the first predicted data set into a first training model to obtain probability of occurrence of failure for the hard disk on the verge of failure over a future second preset period of time, wherein the first training model is trained by a first artificial intelligence algorithm based on a first training data set comprising positive sample data and negative sample data, wherein the positive sample data comprises variation quantities and discrete quantities corresponding to failed hard disks, and the negative sample data comprises variation quantities and discrete quantities corresponding to non-failed hard disks.

2. The method of claim 1, wherein the step of screening a hard disk on the verge of failure from a plurality of hard disks according to state data acquired of hard disks comprises:
inputting the state data acquired of the hard disks into a second training model to obtain a classification result corresponding to each piece of the state data, the classification result comprising ON THE VERGE OF FAILURE and HEALTH, wherein the second training model is trained by a second artificial intelligence algorithm based on a second training data set comprising positive sample data and negative sample data, wherein the negative sample data comprises the state data corresponding to the non-failed hard disks in the plurality of hard disks, and the positive sample data comprises the state data corresponding to the failed hard disks in the plurality of hard disks; and
determining a hard disk with a proportion of classification results of ON THE VERGE OF FAILURE in total classification results obtained exceeding a second threshold as the hard disk on the verge of failure.

3. The method of claim 1, wherein the state data comprises:
SMART information of the hard disks and/or input/output (I/O) information of the hard disks.

4. The method of claim 3, wherein the SMART information comprises at least one selected a group consisting of reallocated sector count, reported uncorrectable errors, hardware ECC (Error Correcting Code) recovered, raw read error rate, seek error rate, and high fly write, and the I/O information comprises at least a number of written bulks.

5. The method of claim 1, further comprising:
before inputting the first predicted data set into the first training model, merging the state data of the hard disks over the first preset period of time into one item of data, and calculating the variation quantity and discrete quantity of each of the state data in the item of data; and
marking the variation quantities and discrete quantities of the non-failed hard disks in the hard disks as negative sample data, and the variation quantities and discrete quantities of the failed hard disks in the hard disks as positive sample data, to obtain the first training data set.

6. The method of claim 1, further comprising:
updating data to be updated in an original data set with newly acquired state data of the hard disks, wherein the data to be updated is the state data in the original data set acquired over an earliest third preset period of time.

7. The method of claim 1, wherein the variation quantity is calculated by one equation selected for a group consisting of:

$\Delta = \Sigma_{n=1}^{k} |a_n - a_{n+1}|$, $\Delta = \Sigma_{n=1}^{k} |a_n - a_{n+2}|$, $\Delta = \Sigma_{n=1}^{k} |a_n - a_{n+1}|$ and $\Delta = \Sigma_{n=1}^{k} |a_n - a_{k-n}|$, where $\Delta$ is the variation quantity, $a_n$ is the $n^{th}$ piece of the state data acquired over the first period of time, and k is the total number of the state data acquired over the first period of time.

8. An apparatus for predicting occurrence time of hard disk failure, comprising:
a processor; and
a memory, configured to store instructions executable by the processor;
the instructions, when executed by the processor, cause the processor to execute steps of:
screening a hard disk on the verge of failure from a plurality of hard disks according to acquired state data of the plurality of hard disks;
calculating variation quantity and discrete quantity of each piece of the state data of the hard disk on the verge of failure acquired over a first preset period of time, to obtain a first predicted data set; and
inputting the first predicted data set into a first training model to obtain probability of occurrence of failure for the hard disk over a future second preset period of time, wherein the first training model is trained by a first artificial intelligence algorithm based on a first training data set comprising positive sample data and negative sample data, wherein the positive sample data comprise variation quantities and discrete quantities corresponding to failed hard disks, and the negative sample data comprises variation quantities and discrete quantities corresponding to non-failed hard disks.

9. The apparatus of claim 8, wherein the step of screening a hard disk on the verge of failure from a plurality of hard disks according to acquired state data of the plurality of hard disks comprises:
inputting the acquired state data of the hard disks into a second training model to obtain a classification result corresponding to each piece of the state data, the classification result comprising ON THE VERGE OF FAILURE and HEALTH, wherein the second training model is trained by a second artificial intelligence algorithm based on a second training data set comprising positive sample data and negative sample data, wherein the negative sample data comprises the state data corresponding to the non-failed hard disks in the plurality of hard disks, and the positive sample data comprises the state data corresponding to the failed hard disks in the plurality of hard disks; and
determining hard disks of which the proportion of the classification results categorized as ON THE VERGE OF FAILURE in the total classification results obtained exceeds a second threshold as hard disks that are on the verge of failure.

10. The apparatus of claim 8, wherein the state data comprises:
    SMART information of the hard disks and/or input/output (I/O) information of the hard disks.

11. The apparatus of claim 10, wherein the SMART information comprises at least one selected from a group consisting of reallocated sector count, reported uncorrectable errors, hardware ECC (error correcting code) recovered, raw read error rate, seek error rate, and high fly write, and the I/O information comprises at least a number of written bulks.

12. The apparatus of claim 8, wherein, the instructions, when executed by the processor, cause the processor to further execute steps of:
    before inputting the first predicted data set into the first training model, merging the state data of the hard disks over the first preset period of time into one item of data, and calculating the variation quantity and discrete quantity of each piece of the state data in the item of data; and
    marking the variation quantities and discrete quantities of the non-failed hard disks in the hard disks as negative sample data, and marking the variation quantities and discrete quantities of the failed hard disks in the hard disks as positive sample data, to obtain the first training data set.

13. The apparatus of claim 8, wherein, the instructions, when executed by the processor, cause the processor to further execute a step of:
    updating data to be updated in an original data set with newly acquired state data of the hard disks, wherein the data to be updated is the state data in the original data set acquired in an earliest third preset period of time.

14. The apparatus of claim 8, wherein the variation quantity is calculated by one equation selected from a group consisting of:
$\Delta = \sum_{n=1}^{k} |a_n - a_{n+1}|$, $\Delta = \sum_{n=1}^{k} |a_n - a_{n+2}|$, $\Delta = \sum_{n=1}^{k} |a_n - a_{n+1}|$ and $\Delta = \sum_{n=1}^{k} |a_n - a_{k-n}|$,
    where $\Delta$ is the variation quantity, $a_n$ is the $n^{th}$ piece of the state data acquired over the first period of time, and k is a total number of pieces of the state data acquired over the first period of time.

15. A non-transitory computer-readable storage medium storing instructions which, when executed by a processor, cause the processor to execute a method for predicting occurrence time of hard disk failure, the method comprising steps of:
    screening a hard disk on the verge of failure from a plurality of hard disks according to state data acquired of the plurality of hard disks;
    calculating variation quantity and discrete quantity of each piece of the state data of the hard disk on the verge of failure acquired over a first preset period of time, to obtain a first predicted data set; and
    inputting the first predicted data set into a first training model to obtain probability of occurrence of failure for the hard disk on the verge of failure over a future second preset period of time, wherein the first training model is trained by a first artificial intelligence algorithm based on a first training data set comprising positive sample data and negative sample data, wherein the positive sample data comprises variation quantities and discrete quantities corresponding to failed hard disks, and the negative sample data comprises variation quantities and discrete quantities corresponding to non-failed hard disks.

* * * * *